Oct. 16, 1923. 1,470,669
H. O. HEM
WEIGHING SCALE
Filed Feb. 25, 1920 5 Sheets-Sheet 1
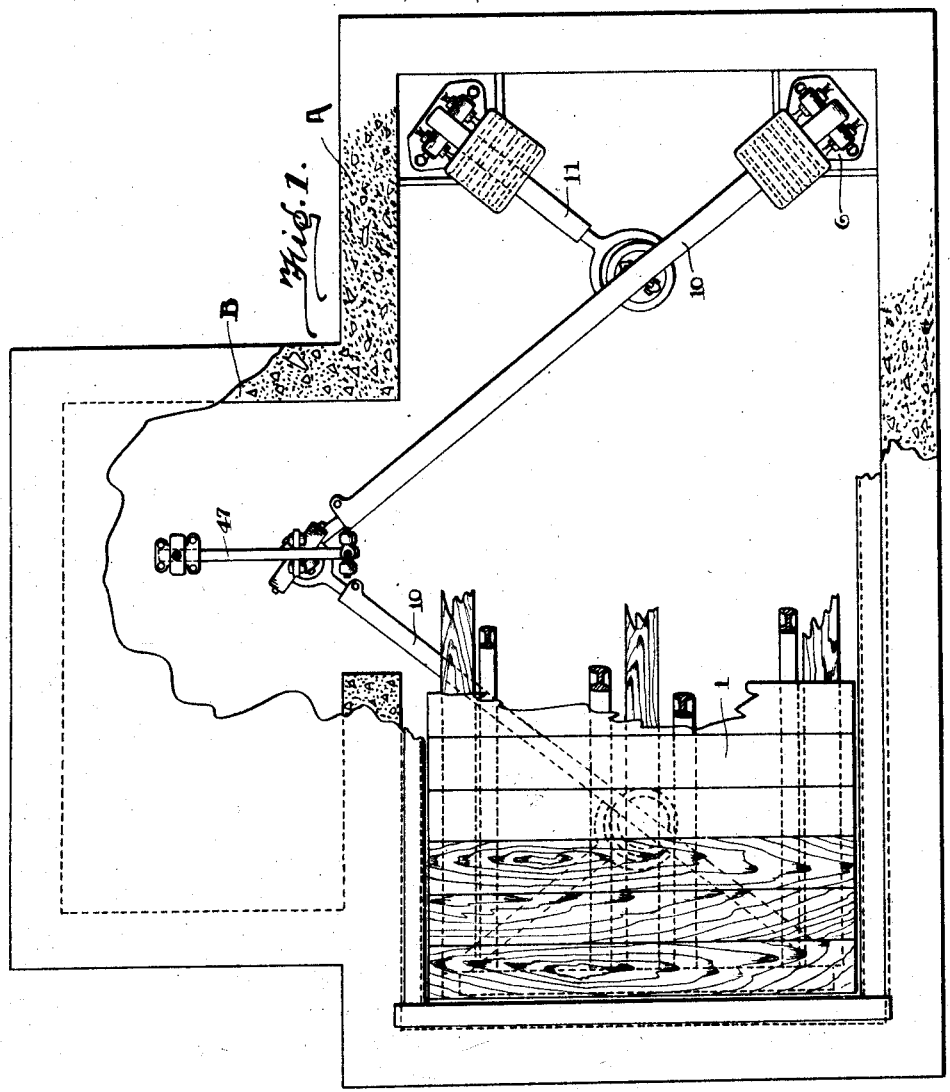

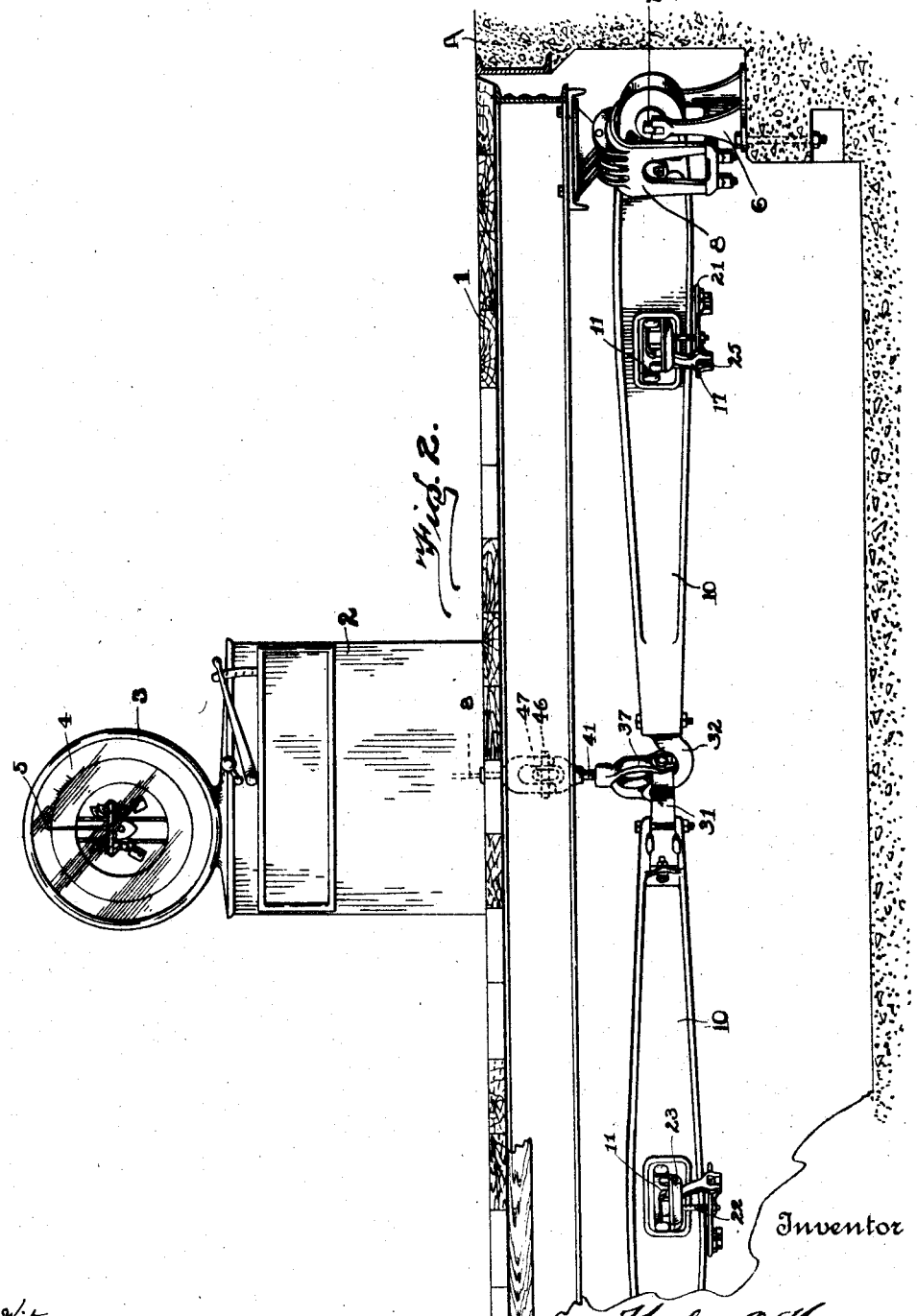

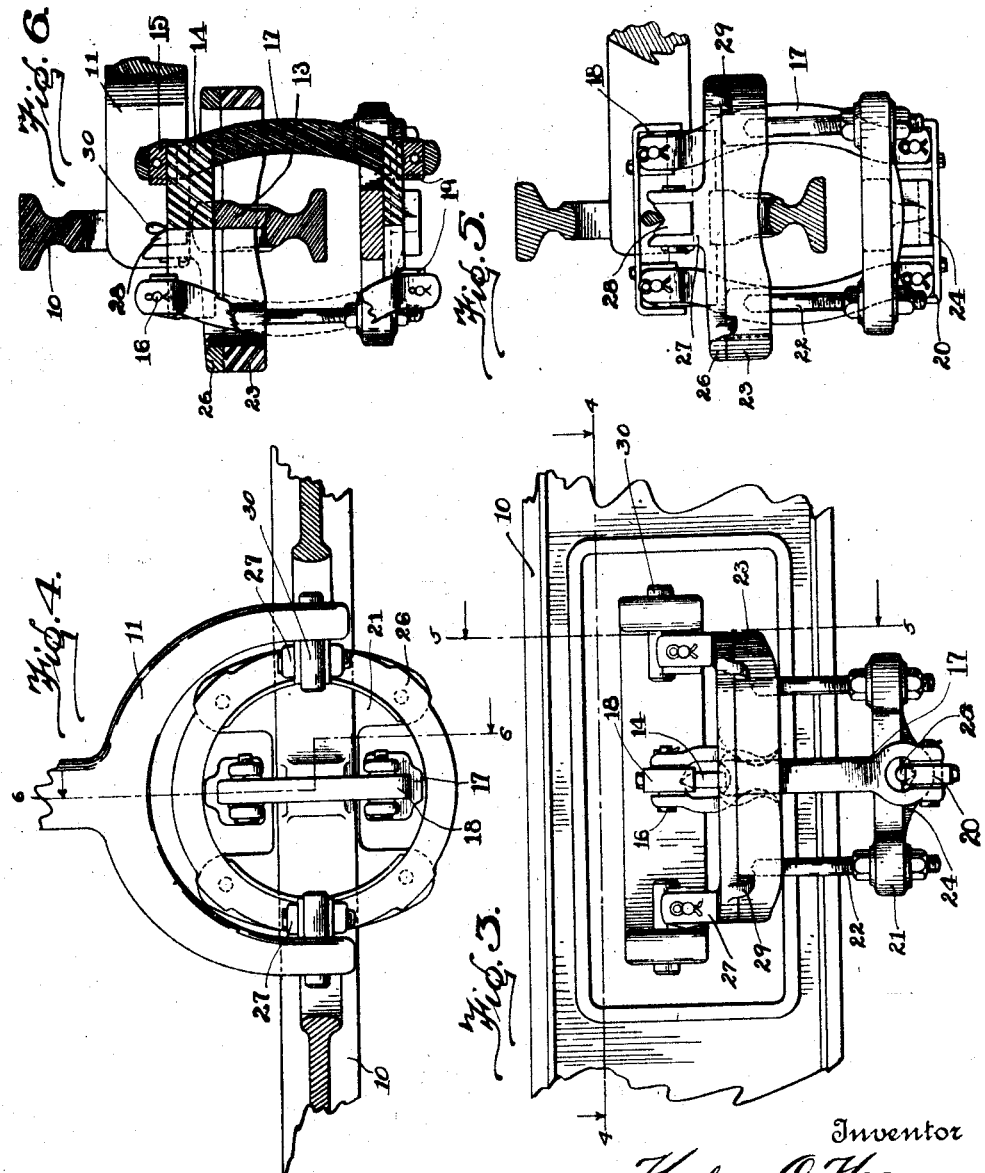

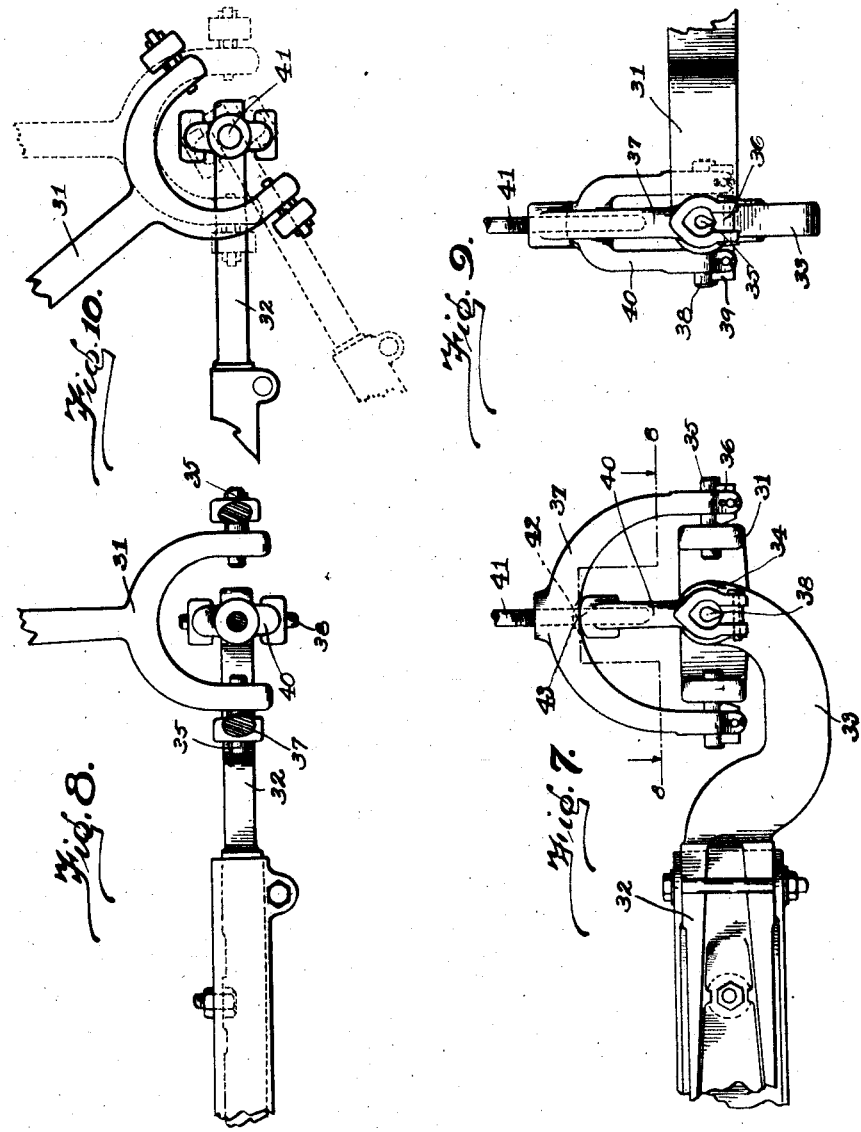

Oct. 16, 1923.
H. O. HEM
WEIGHING SCALE
Filed Feb. 25, 1920
1,470,669
5 Sheets-Sheet 5
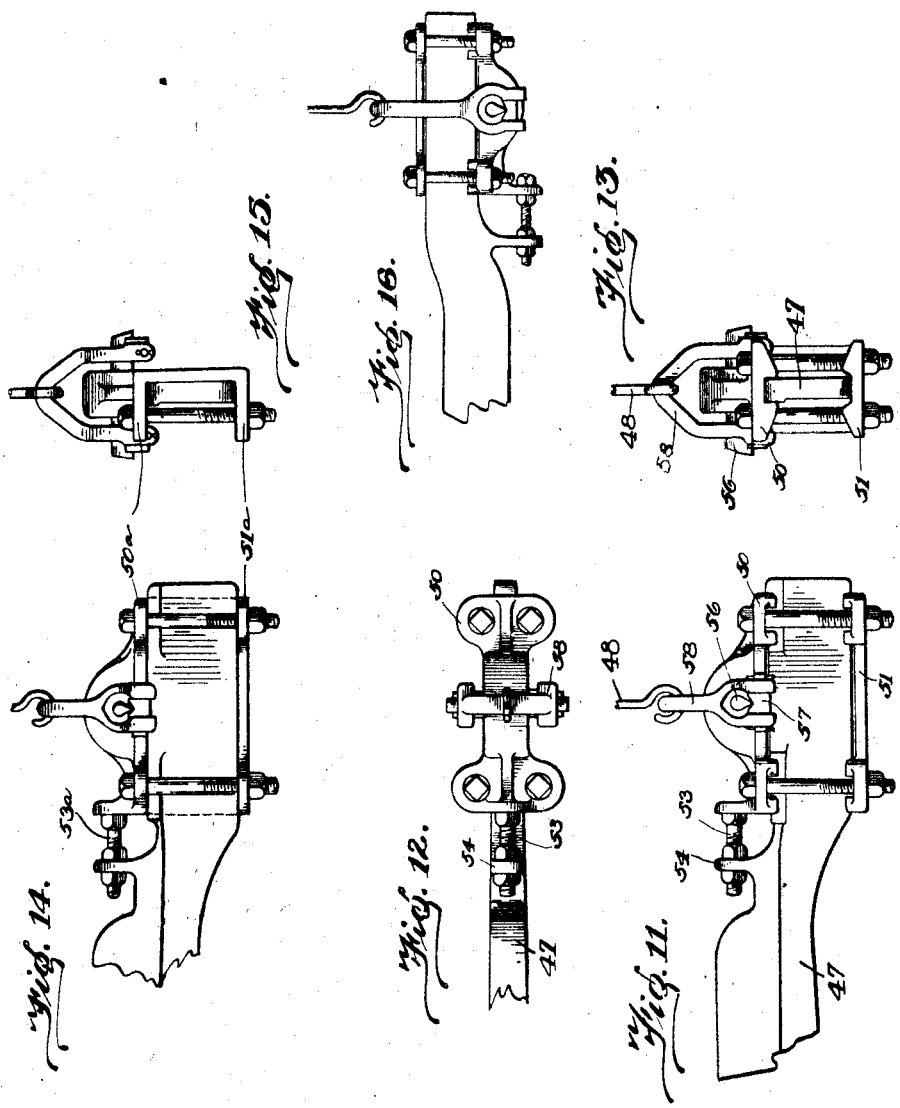

Patented Oct. 16, 1923.

1,470,669

UNITED STATES PATENT OFFICE.

HALVOR O. HEM, OF TOLEDO, OHIO, ASSIGNOR TO TOLEDO SCALE COMPANY, OF TOLEDO, OHIO, A CORPORATION OF NEW JERSEY.

WEIGHING SCALE.

Application filed February 25, 1920. Serial No. 361,250.

*To all whom it may concern:*

Be it known that I, HALVOR O. HEM, a citizen of the United States, residing at Toledo, in the county of Lucas and State of Ohio, have invented certain new and useful Improvements in Weighing Scales, of which the following is a specification.

This invention relates to weighing scales, and particularly to the platform lever mechanism thereof, and I have illustrated it as embodied in a scale of a type adapted for weighing comparatively heavy loads, such, for example, as loaded wagons. It is to be understood, however, that the invention is also capable of embodiment in other types of scales and that I contemplate its use wherever applicable.

Any out-of-plumb condition or binding in the connections between the platform levers of a scale sets up forces which, if the pivot edges of the levers are not in the same horizontal plane, have vertical components that injuriously affect the accuracy of the scale. Owing to the facts that fulcrum stands are not always absolutely rigid, that there is a certain amount of deflection in the levers and other parts, and that the levers swing about different pivotal axes, a permanently plumb condition in the connections cannot ordinarily be obtained. One of the principal objects of this invention is to prevent such injurious out-of-plumb and out-of-level conditions by providing means for connecting the platform levers of the scale so that all of the lever pivots may be in substantially the same horizontal plane and the axes of the connecting pivots may intersect at the intersection of the central vertical planes of the respective levers.

Another object of the invention is to so construct the pivotal connections that the levers may be placed at any desired angle to each other without injuriously affecting the arrangement of the pivots.

Another object is to so construct the pivotal connections as to allow free movement of the levers about the fulcrums without causing binding.

Another object is the provision of means for connecting the noses of two or more levers to a depending member so that the axes of the nose pivots intersect on the vertical axis of such depending member.

Still another object is the provision of an improved adjustable nose iron which is easily machined and capable of accurate adjustment.

Other objects and advantages will be apparent from the following description, in which reference is had to the accompanying drawings illustrating preferred embodiments of my invention and wherein similar reference numerals designate similar parts throughout the several views.

In the drawings:—

Figure is a plan view of a scale embodying my invention, parts being broken away to disclose the platform levers;

Figure 2 is an enlarged fragmentary sectional elevation of the scale shown in Figure 1;

Figure 3 is a fragmentary elevation showing a connection between two of the scale levers;

Figure 4 is a sectional plan view, the section being taken substantially on the line 4—4 of Figure 3;

Figure 5 is a vertical sectional view, the section being taken substantially on the line 5—5 of Figure 3;

Figure 6 is a similar view, the section being taken substantially on the line 6—6 of Figure 4;

Figure 7 is a fragmentary elevation showing a part of the connection from the long platform levers to the shelf lever of the scale;

Figure 8 is a sectional plan view taken substantially on the line 8—8 of Figure 7;

Figure 9 is an elevational view taken from the right of Figure 7;

Figure 10 is a somewhat diagrammatic plan view showing several possible positions of the levers;

Figure 11 is a side elevation of the nose iron of the shelf lever;

Figures 12 and 13 are respectively a plan view and end elevation thereof;

Figure 14 is a side elevation of another form of shelf lever nose;

Figure 15 is an elevation of the same; and

Figure 16 is a side elevation of still another form of shelf lever nose.

I have shown the mechanism of my invention as erected in a pit A of concrete, which is covered by the scale platform 1 and has an extension B covered by a deck upon which is placed a cabinet 2 housing the beam weighing mechanism. The platform lever mechanism of my invention is adapted for use with either automatic or non-automatic weighing mechanism, and I have, for the purpose of illustration, shown it as embodied in a scale in which the cabinet is surmounted by a head 3 containing automatic weighing mechanism of the pendulum type and a dial 4 upon which the load offset by the pendulum mechanism is indicated by means of a hand 5. Since my present invention covers only the platform lever mechanism of the scale I have not shown the weighing mechanism contained in the cabinet and head in detail and will not attempt to describe it nor delineate its action.

Suitably mounted within the pit A are fulcrum stands 6 which support the fulcrum pivots 7 of the platform levers. The platform is supported upon the load pivots of the scale levers by means of suspension bearings 8 hingedly connected to the girders of the platform structure. The means by which the platform is supported upon the load pivots of the platform levers is described in detail in my co-pending application, Ser. No. 361,251, filed on even date herewith, and the invention claimed in this application does not reside in the specific structure of the suspension bearings per se, the invention claimed herein being also adapted for embodiment in scales having other specific means for supporting the platform from the load pivots.

I have illustrated a scale having a pair of long levers 10 and a pair of short levers 11 connected thereto by means of a connection forming a part of my invention. It is to be understood, however, that this connection may also be used in connection levers otherwise arranged. Each of the long levers 10 is provided with a transverse opening of substantially rectangular shape, and rising from the lower side of each of said openings is a lug or standard 13 having a transverse groove in its upper end. Seated in the grooved upper end of the lug 13 is a knife-edged pivot bar 14 of sufficient length to extend beyond the sides of the lever 1, and supported upon each end of the upturned knife edge of the pivot 14 is a grooved bearing block 15. Each block 15 is provided with a perforation which receives a pin 16 to swingingly support a depending link 17 which extends to a point below the edge of the lever 10. The blocks 15 which rest upon the upper edge of the pivot 14 are rigidly connected by means of a strip 18, the ends of which are turned downwardly over the ends of the blocks and form thrust bearings for the ends of the pivot 14. The links 17 extend outwardly on each side of the lever and their lower ends are pivotally connected by means of pins to a pair of bearing blocks 19 which are identical with the blocks 15 but which have their grooved sides uppermost. A strip 20, identical with the strip 18, rigidly connects the blocks 19 so that when the links 17 swing on their supporting pins the bearing blocks 19 are not tilted and the grooves in the blocks remain in horizontal alignment.

Supported by the blocks 19 is a frame comprising a plate-like member 21 carrying a plurality of adjustable upright posts 22 upon the upper ends of which is secured an annulus 23. Extending downwardly from the lower face of the plate-like member 21 is a lug 24, and a pivot bar 25 extends through the lug 24 and rests upon the bearing blocks 19.

The posts 22 extend upwardly on both sides of the lever 10 and the annulus 23 extends through the opening in the lever. A second annulus 26 rests upon the upper face of the annulus 23 and carries pairs of upright lugs 27 between each pair of which is pivoted a grooved bearing block 28, the bottoms of the grooves lying in the same plane as the knife edge of the pivot 14. Lugs 29 extend downwardly from the annulus 26 and embrace the annulus 23 and serve to hold the annuli in concentric relation while permitting relative rotation thereof. The nose end of each of the levers 11 is bifurcated and extends into the rectangular opening in the corresponding lever 10.

Nose pivots 30 extend inwardly from each of the furcations and rest in the grooves of the bearing block 28. The annuli are thus held against tilting transversely of the lever 11, and since they are so supported that they cannot tilt transversely of the lever 10 they must at all times remain horizontal.

The parts are so proportioned and arranged that when in normal position the edges of the pivots 14 and 30 lie in lines which intersect in the line of intersection of the central vertical planes of the levers 10 and 11. During weighing movements the edges of the pivots 14 and 30 are always in a horizontal plane and are free to move in that plane relatively to each other. Owing to this arrangement no strains having vertical components can be set up by slight displacements or distortions of the levers. Since the annuli 23 and 26 are relatively rotatable, it is evident that the lever 11 may be placed at any convenient angle to the lever 10.

In order that the nose pivots of the long levers 10 may lie in the same horizontal plane, I have provided one of the levers with a forked nose iron 31 and the other with a nose iron 32 having a depressed portion 33 adapted to pass beneath one of the forks and an upturned end 34 adapted to extend between them. The nose pivots 35 of the forked nose iron are supported in pivoted bearings 36 carried by a yoke 37, while the nose pivot 38 of the nose iron 32 is supported in pivoted bearings 39 carried by a smaller yoke 40. The yoke 40 is secured to the lower end of a rod 41 and the yoke 37 is swiveled upon the rod 41 and is provided with a socket 42 which receives a spherical projection 43 on the yoke 40. While the yoke 37 is thus supported upon the yoke 40 it is universally movable with respect thereto, so that the levers may be placed at any desired angle to each other. The levers 10 and 11 may therefore be arranged to cooperate with a platform of any desired shape.

The upper end of the rod 41 is secured to a stirrup which is supported by the load pivot 46 of a shelf lever 47 supported from the deck of the pit extension B, the nose of the shelf lever being connected to a steelyard 48 leading upwardly to the weighing beam in the cabinet 2.

In order to provide for adjusting the length of the shelf lever 47 I have provided a novel nose iron structure, several forms of which are shown in Figures 11 to 16. Socketed or box-like nose irons, which are adapted to be slipped over the ends of levers, are difficult to machine, but the nose iron of my invention is so constructed as to facilitate machining of the parts which engage the lever. In the form shown in Figures 11 to 13 I have constructed the nose iron in two parts, 50 and 51. The upper part 50 is provided with channeled portions to fit the upper side of the lever end and the lower part 51 is provided with channeled portions to fit the lower side of the lever end. The upper and lower parts are tied together by means of bolts, and an adjusting screw 53 passing through an ear 54 on the lever and engaging a lug on the upper nose iron part 50 provides for very accurate adjustment of the effective length of the lever. The nose pivot 56 is, in this form of the device, secured to the upper part 50 and rests in bearings 57 pivotally carried by the clevis 58.

In the modification shown in Figures 14 and 15 the nose iron is in the form of a channeled member open at one side, the interior of the channel being comparatively easy to machine. The upper and lower sides 50ª and 51ª of the channel correspond to the parts 50 and 51 of the nose iron structure described above. They are tied together by means of bolts 52ª which, when the nose iron has been slipped upon the lever and adjusted by means of the screw 53ª, may be tightened and the nose iron thus securely clamped in place.

The structure shown in Figure 16 is substantially the same as the form shown in Figure 11, except in that it is inverted and the steelyard is connected to the lower part 50ᵇ of the nose iron construction, the pivot 56ᵇ having its edge, of course, turned downwardly. The clevis 58ᵇ used with this structure must be long enough to embrace the end of the lever. It is to be noted that by means of my connections the pivots of the levers 10 and 11 may all be located in the same plane and that the pull of each of the levers is effectually transmitted to the steelyard 48.

While it will be apparent that the illustrated embodiments of my invention herein disclosed are well calculated to adequately fulfill the objects primarily stated, it is to be understood that the invention is susceptible to variation, modification and change within the spirit and scope of the subjoined claims.

Having described my invention, I claim:

1. In a scale, in combination, a long lever having fulcrum, load and nose pivots and an intermediate pivot, a short lever having fulcrum, load and nose pivots, all of the pivots of both of said levers lying in substantially the same horizontal plane, and means whereby the nose pivot of the short lever is supported from the intermediate pivot of the long lever.

2. In a scale, in combination, a long lever having fulcrum, load and nose pivots and an intermediate pivot, a short lever having fulcrum, load and nose pivots, all of the pivots of both of said levers lying in substantially the same horizontal plane, and means whereby the nose pivot of the short lever is supported from the intermediate pivot of the long lever, the axes of the nose pivot of said short lever and the intermediate pivot of said long lever intersecting substantially in the central vertical plane of said long lever.

3. In a scale, in combination, a lever, an intermediate pivot thereon, a second lever having a nose pivot and means whereby said nose pivot is supported by said intermediate pivot, the axes of said pivots intersecting substantially in the central plane of the first said lever.

4. In a scale, in combination, a lever, an intermediate pivot thereon, a second lever having a nose pivot thereon, the axes of said pivots intersecting substantially in the central plane of the first said lever, and flexible connecting means between said pivots.

5. In a scale, in combination, a lever having an intermediate pivot, a lever having a nose pivot, the axes of said pivots intersecting in the line of intersection of the central planes of said levers, and flexible connecting means between said pivots.

6. In a scale, in combination, a lever having a transverse opening, a pivot supported in said opening, and a second lever having a nose pivot, the axes of said pivots intersecting in the central vertical plane of the first said lever.

7. In a scale, in combination, a lever having a transverse opening therethrough, a pivot supported in said opening, an articulated frame supported by said pivot, and a second lever having its nose extending into said opening and supported by said frame.

8. In a scale, in combination, a lever having a transverse opening therein, a pivot supported in said opening, a pair of links depending from said pivot, a rigid member supported by said links, and a second lever having a nose pivot, the axis of which extends into said opening, said nose pivot being supported on said rigid member.

9. In a scale, in combination, a lever having a transverse opening therein, a pivot supported in said opening, a pair of links depending from said pivot, an annulus in said opening supported by said links, and a second lever having a nose pivot supported on said annulus.

10. In a scale, in combination, a lever having an opening therein, an annulus supported in said opening, a second annulus on the first said annulus, and pivot bearings supported by said second annulus.

11. In a scale, an adjustable universal pivotal connection comprising, in combination, a pivotally supported annulus, a second annulus lying thereon and rotatable with respect thereto, and a pivotal support carried by said second annulus.

12. In a scale, in combination, a pair of converging levers each having a nose pivot, the axes of said nose pivots intersecting substantially in the line of intersection of the central vertical planes of said levers, and means connecting said nose pivots to the load-offsetting mechanism of the scale.

13. In a scale, in combination, a pair of converging levers each having a nose pivot, the axes of said nose pivots lying in the same horizontal plane and intersecting substantially in the line of intersection of the central vertical planes of said levers, and means connecting said nose pivots to the load-offsetting mechanism of the scale.

14. In a scale, in combination, a pair of converging levers each having a nose pivot, the axes of said nose pivots intersecting substantially in the line of intersection of the central vertical planes of said levers, and means, including a pair of relatively rotatable members, connecting said nose pivots to the load-offsetting mechanism of the scale.

15. In a scale, in combination, a pair of converging levers, one of said levers having a forked nose straddling the nose of the other said lever, and means for connecting the noses of said levers to the load-offsetting mechanism of the scale.

16. In a scale, in combination, a pair of converging levers, one of said levers having an upturned nose, the nose of the other of said levers being forked and straddling said upturned nose, and a pair of swivelly connected yokes supporting the noses of said levers.

17. In a scale, a lever nose structure comprising, in combination, a lever end, a member engaging the upper side of said lever end, a member engaging the lower side of said lever end, one of said members carrying a nose pivot, and means for clamping said members respectively against the upper and lower sides of said lever end.

18. In a scale, a lever nose structure comprising, in combination, a lever end, a member engaging the upper side of said lever end, a member engaging the lower side of said lever end, one of said members carrying a nose pivot, means for clamping said members respectively against the upper and lower sides of said lever end, and means for adjusting said members longitudinally of said lever.

19. In a scale, a lever nose structure comprising, in combination, a lever end, a member having a downwardly opening recess receiving the upper side of said lever end, a member having an upwardly opening recess receiving the lower side thereof, one of said members carrying a nose pivot, and means for clamping said members upon said lever end.

20. In a scale, a lever nose structure comprising, in combination, a lever end, a member having a downwardly opening recess receiving the upper side of said lever end, a member having an upwardly opening recess receiving the lower side thereof, one of said members carrying a nose pivot, means for clamping said members against said lever end, and means for adjusting said members longitudinally of said lever.

21. In a scale, a lever nose structure comprising, in combination, a lever end, a member having a downwardly opening recess receiving the upper side of said lever end, a member having an upwardly opening recess receiving the lower side thereof, one of said members carrying a nose pivot, each of said members having laterally extending ears, and bolts passing through said ears for tying said members together.

HALVOR O. HEM.

Witnesses:
C. E. WILCOX,
C. O. MARSHALL.